(12) United States Patent
Zaydman

(10) Patent No.: US 10,846,241 B2
(45) Date of Patent: Nov. 24, 2020

(54) SCORE-BASED CACHE ADMISSION AND EVICTION

(71) Applicant: VMware, Inc., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 16/116,415

(22) Filed: Aug. 29, 2018

(65) Prior Publication Data

US 2020/0073825 A1 Mar. 5, 2020

(51) Int. Cl.
| | |
|---|---|
| *G06F 12/126* | (2016.01) |
| *G06F 12/128* | (2016.01) |
| *G06F 12/0888* | (2016.01) |
| *G06F 12/0811* | (2016.01) |
| *G06F 12/0891* | (2016.01) |
| *G06F 12/0897* | (2016.01) |
| *G06F 12/123* | (2016.01) |

(52) U.S. Cl.
CPC ........ *G06F 12/126* (2013.01); *G06F 12/0811* (2013.01); *G06F 12/0888* (2013.01); *G06F 12/0891* (2013.01); *G06F 12/0897* (2013.01); *G06F 12/123* (2013.01); *G06F 12/128* (2013.01)

(58) Field of Classification Search
CPC ............... G06F 12/126; G06F 12/0811; G06F 12/0888; G06F 12/0891; G06F 12/0897; G06F 12/123; G06F 12/128
See application file for complete search history.

(56) References Cited

U.S. PATENT DOCUMENTS

| | | | | |
|---|---|---|---|---|
| 9,268,692 | B1* | 2/2016 | Wehman | G06F 16/10 |
| 2003/0088739 | A1* | 5/2003 | Wilkes | G06F 12/0888 |
| | | | | 711/133 |
| 2010/0250834 | A1* | 9/2010 | Trika | G06F 12/0888 |
| | | | | 711/103 |
| 2014/0173214 | A1* | 6/2014 | Ramrakhyani | G06F 12/08 |
| | | | | 711/135 |
| 2015/0074340 | A1* | 3/2015 | Criswell | G06F 12/0888 |
| | | | | 711/103 |
| 2018/0246672 | A1* | 8/2018 | Graham | G06F 3/0679 |

OTHER PUBLICATIONS

Sajeev, G.P. and M.P. Sebastian, "A Scheme for Adaptive Web Caching Based on Multi Level Object Classification," International Conference on Intelligent and Advanced Systems, 2010.*

* cited by examiner

*Primary Examiner* — Tracy A Warren

(57) ABSTRACT

The subject matter described herein analyzes an item that is a candidate for admission into or eviction from a cache to determine characteristics of the item. The characteristics include at least one of item content and item source. A score associated with the item is calculated based on the determined characteristics. The item is admitted into, or evicted from, the cache based on the calculated score.

20 Claims, 8 Drawing Sheets

SCORE-BASED CACHE ADMISSION AND EVICTION

BACKGROUND

In computing devices and/or systems, caches are provided to store data in memory to speed up access of data. Caches are provisioned by keeping a small percentage of data items in a memory that is fast and/or close to the applications that would run on computing devices. Caches improve the input/output performance of the computing devices. Caches are, however, subject to size constraints, and therefore, when a cache is full, at least one item must be evicted from the cache to free up space for a new item based on a certain policy. This policy is referred to as a cache replacement policy.

Existing systems rely on item access patterns to decide which item to evict upon a cache becoming full. Different existing system employ different cache replacement policies. For example, some existing system evict a least recently used (LRU) item to make way for another item. Some other systems employ a policy to evict a least frequently used (LFU) item. Other cache replacement policies such as first-in-first-out (FIFO), time aware least recently used (TLRU), pseudo-LRU (PLRU) and the like, are used by some other existing systems. Random replacements are also used by some existing systems.

However, the existing systems lack a comprehensive policy for both cache eviction and cache admission. Hence in the existing systems, cache performance is not optimized to speed up item access by applications running on a computing device and/or system.

SUMMARY

Various aspects of the systems and methods described herein analyze an item to determine characteristics of the item, the characteristics comprising item content, or item source or both. A score associated with the item is calculated based on the determined characteristics. The item is admitted into a cache based on the calculated score.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present description will be better understood from the following detailed description read in the light of the accompanying drawings, wherein.

DETAILED DESCRIPTION

Figure 1:
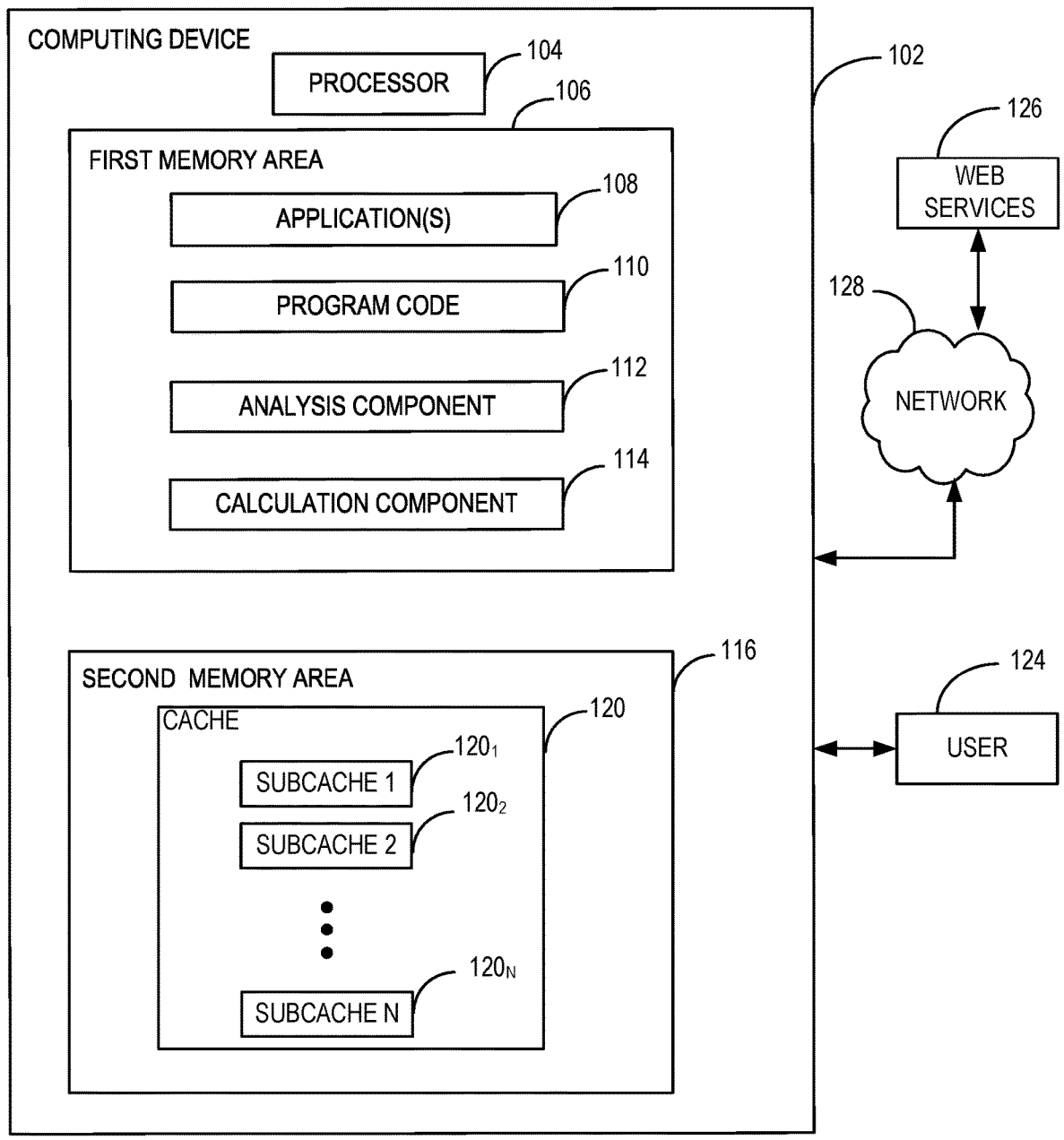
FIG. 1 illustrates a block diagram of a computing device that employs caching as a means to speed up access of data, according to an example embodiment.

Various aspects of the systems and methods described herein provide at least a cache 120 to speed up access of items by application(s) 108 running on a computing device 102, as shown in FIG. 1. A cache may comprise a high-performance storage device, such as a volatile memory, non-volatile storage (e.g., flash storage), or the like. A cache or a subcache may comprise a part of a high-performance storage device, such as a volatile memory, non-volatile storage or the like, provisioned via software. The size of the cache may be dynamically altered via the software.

The cache may be leveraged most effectively by not only selectively evicting data items but also selectively admitting data items. In the present disclosure, instead of focusing merely on an eviction candidate, various strategies for selecting an item for admission into a cache have also been disclosed. Thus, the present disclosure addresses situations where given a newly accessed item and an eviction candidate from the cache, a decision is to be made whether it is worth admitting the new item into the cache at the expense of the eviction candidate. Additionally, a decision about eviction of an item from the cache is also addressed.

An item that is an admission/eviction candidate may originate from various sources and may contain different data. In contrast with existing systems that employ access patterns of an item to decide on eviction from the cache, the current disclosure utilizes a score associated with the item based on what the item represents. The score associated with the item is used to decide the suitability of the item for cache admission/eviction. For example, information relating to the source of the item and the data it contains is advantageously used as a guide for cache admission as well as cache eviction.

In one example, before making a decision about admitting an item into the cache, a score associated with the item is calculated. In an example, the score is a function of the source of the item and the data of the item. Given the source of the item and the data of the item, various heuristics may be used to arrive at a score. Various other means such as machine learning or, more specifically an artificial neural network, may be used to calculate a score associated with the item that is a candidate for cache admission. For example, a trained neural network, such as a feed-forward neural network with backpropagation may be used for this purpose.

In an example, the calculated score is compared with a threshold to make a decision about suitability of the item for admission into a cache. For example, when the score is above or equal to the threshold, the item is admitted into the cache, otherwise the item is not admitted into the cache. In some examples, the score is also used for eviction of an item from the cache.

In another example as shown in FIG. 1, the cache 120 may be subdivided into a plurality of subcaches 1201, 1202 to 120N and items with various ranges of scores are admitted into subcaches based on the item score falling within a given range. In an example, a method that also enables deduplication is used for determining the score associated with an item. In this example, hashes of disk blocks are stored. Because it is possible to retrieve a file once its starting block (e.g., the first block) is known, only the starting block of a file is cached (e.g., a hash of the starting block of each file is cached). There are at least two ways to determine with a certain probability that a given block is the starting block of a file. The first method, which may be called "head recognition" looks for a certain pattern (for example, some libraries start with the letters "MZ"). The other method is to determine if a block is the last block of a file. Once the last block is known, the next block would be the starting block of another file. This method may be called "tail recognition." For tail recognition, the block should end in one or more zeros. However, head recognition is often more accurate than the tail recognition. Thus, head recognition gives first block recognition with greater probability of correctness (e.g., 0.9 on a scale of 0.0 to 1.0) than the tail recognition (e.g., 0.1 on a scale of 0.0 to 1.0). Accordingly, the score for a block is set to 1 if the block is selected based on the head recognition, the score of a block selected based of tail recognition is set as zero, and the score of a block that meets neither criterion is set as −1. In one example a cache 500 comprises a hierarchy of three subcaches C2 (502), C1 (508), and C0 (504). In this example, an item with a score 1 is stored in a middle level subcache C1, an item with a score 0 is store in a lower level subcache C0, and an item with a score of −1 is not stored. In this example the top level subcache C2 stores items promoted from the middle level subcache C1 or the lower level subcache C0, upon a cache hit.

In this manner, the disclosure is able to select suitable candidates for cache admission as well as cache eviction. Aspects of the disclosure improve the quality of data admitted to the cache thus improving hit rate, decreasing read misses and in turn writes to media. The disclosure provides a better cache hit ratio than some contemporary systems relying on cache eviction policies. Additionally or alternatively, the disclosure provides a similar cache hit ratio for a smaller cache.

Further, the disclosure operates in an unconventional manner by relying on characteristics of an item to determine whether to admit or evict the item from the cache. This improves the functioning of the underlying computing device by making intelligent decisions regarding admission and eviction, thus storing only the items determined to be targets of future cache accesses. The user experience is also improved by having the proper items stored in the cache.

It should be understood that any of the examples herein are non-limiting. As such, the present disclosure is not limited to any particular embodiments, aspects, concepts, structures, functionalities or examples described herein. Rather, the present disclosure may be used in various ways that provide benefits and advantages in computing systems including virtualized computing environments.

FIG. 1 shows an exemplary block diagram of a computing device 102 for selecting a candidate for cache admission and/or eviction as disclosed herein. A user 124 interacts with the computing device 102. The computing device is in communication with web services 126 via a network 128, such as the Internet. The computing device 102 has at least a processor 104. The computing device has a first memory area 106 and a second memory area 116. The first memory area 106 and the second memory area 116 are any devices allowing information, such as computer executable instructions and/or other data, to be stored and retrieved. For example, the first memory area 106 and the second memory area 116 includes one or more random access memory (RAM) modules, flash memory modules, hard disks, solid-state disks, and/or optical disks. In FIG. 1, the first memory 106 and the second memory area 116 refer to local memory and/or storage.

The first memory area stores application(s) 108, a program code 110 comprising computer executable instructions, and computer executable components comprising an analysis component 112 and a calculation component 114. The second memory 116 stores cache 120. In one example, the cache 120 comprises a plurality of subcaches 1201, 1202 to 120N. While cache 120 is shown as being a part of the second memory area 116, cache 120 may be a part of the first memory area 106 or may exist elsewhere in some examples.

The computing device 102 represent any device executing instructions (e.g., as application programs, operating system functionality, or both) to implement the operations and functionality described herein. The computing device 102 may include any portable or non-portable device including a mobile telephone, laptop, tablet, computing pad, netbook, gaming device, portable media player, desktop personal computer, kiosk, and/or tabletop device. Additionally, the computing device 102 may represent a group of processing units or other computing devices, such as in a cloud computing system or service.

The processor 104 may include any quantity of processing units and may be programmed to execute the program code 110 comprising computer executable instructions, the analysis component 112 and the calculation component 114 for implementing aspects of the disclosure. In some embodiments, the processor 104 is programmed to execute instructions such as those illustrated in the figures (e.g., FIG. 2, FIG. 3, FIG. 6, and FIG. 7).

The applications 108, when executed by the processor 104, operate to perform functionality on the computing device 102 to implement tasks associated with the applications 108. Exemplary applications 108 may include mail application programs, web browsers, calendar application programs, address book application programs, messaging programs, media applications, location-based services, search programs, gaming applications, and the like. The applications 108 may communicate with counterpart applications or services such as web services 126 accessible via the network 128. For example, the applications 108 may represent downloaded client-side applications that correspond to server-side services executing in a cloud.

The analysis component 112, when executed by the processor 104, analyzes the source and the data associated with an item that is a candidate for cache admission or cache eviction, to determine its characteristics. The calculation component 114, when executed by the processor 104, calculates a score associated with the item based on the determined characteristics (e.g., as shown in FIG. 2).

Figure 2:
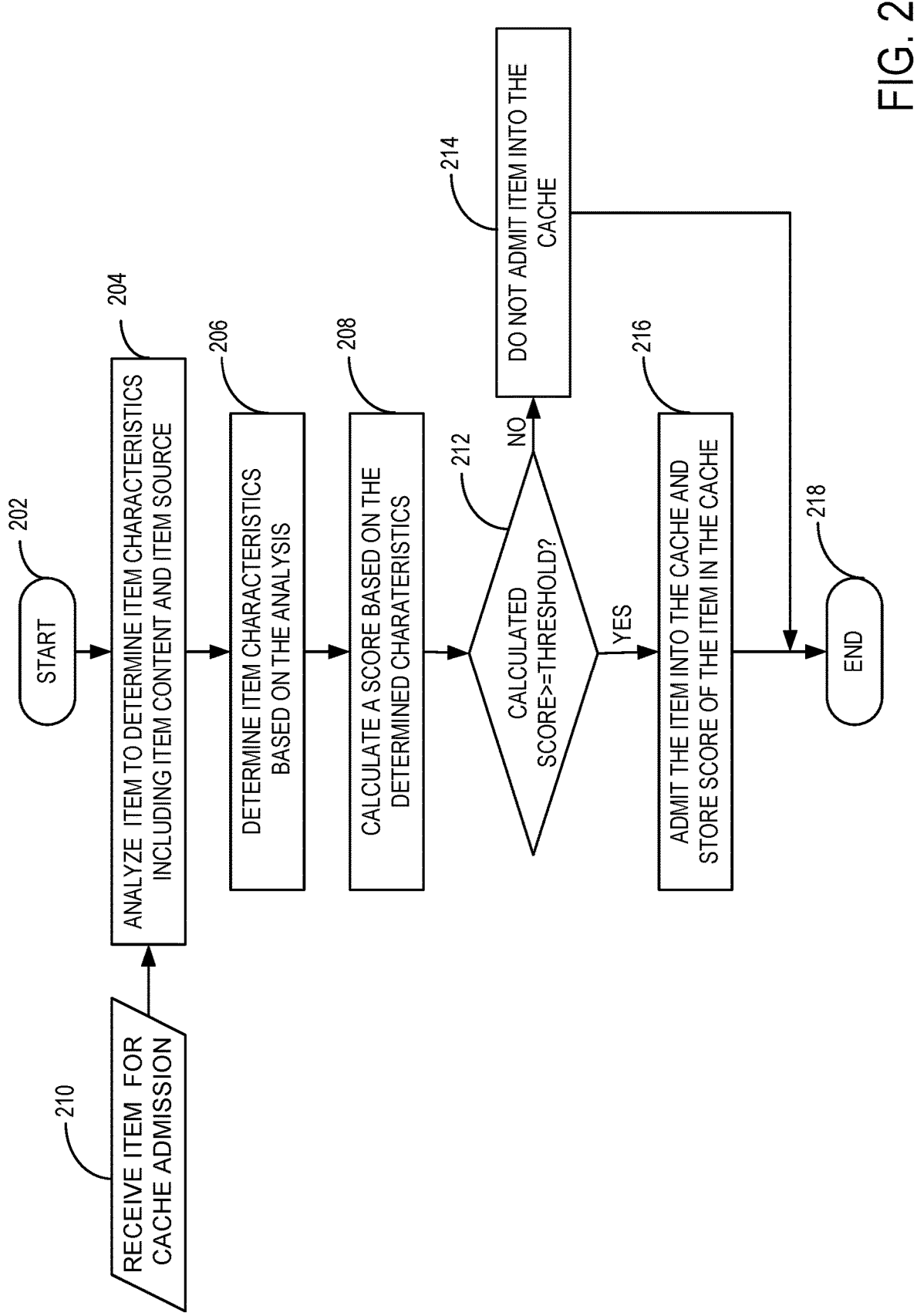
FIG. 2 illustrates a flowchart showing a method for admitting an item into a cache, according to an example embodiment.

Referring next to FIG. 2, a flowchart begins at 202. At 210, an item is received for cache admission. The item is analyzed at 204 to determine the item characteristics. The characteristics include the source of the item and the content of the item. For instance, the source of the item may indicate how often the item is likely to be accessed and the analysis would indicate a probability of subsequent access. For example, an item from a LOG file is likely to be accessed more often than an item from an MP3 file. As another example, an item of a file accessed over a network may be a better candidate for caching and may be retained for a longer period of time in the cache because accessing over the network is more time consuming than accessing from a local file system and also because the network connectivity may not always be available. As regards content of the item, the content indicates, among other things, the criticality and the importance of the content. For example, an encryption key has both a high criticality and high importance.

At 206, the characteristics of the item are determined based on the analysis. At 208, a score associated with the item is calculated based on the determined characteristics. As discussed above, the characteristics include the item source and the item content. Hence, in one example, the calculated score is a function of at least the item source and the item content. In another example, other characteristics such as size of the item are also taken into consideration, in addition to the item source and the item content, for calculating the score of the item. At 212, the calculated score is compared to a threshold. The threshold may be a predetermined threshold that can be set by a user or an automatically varying dynamic threshold. If the calculated score is greater than or equal to the threshold, the item is admitted into the cache at 216 and the score of the item is stored with the item in some examples. In another example, the score is not stored with the item. If the score is less than the threshold, the item is not admitted into the cache at 214 in some examples, while in some other examples the item is admitted into a suitable subcache based on the value of the score as discussed below. The process ends at 218. In another example, there may a plurality of thresholds, and items with different ranges of scores may be admitted to different subcaches into which the cache is subdivided based on scores and thresholds.

Figure 3:
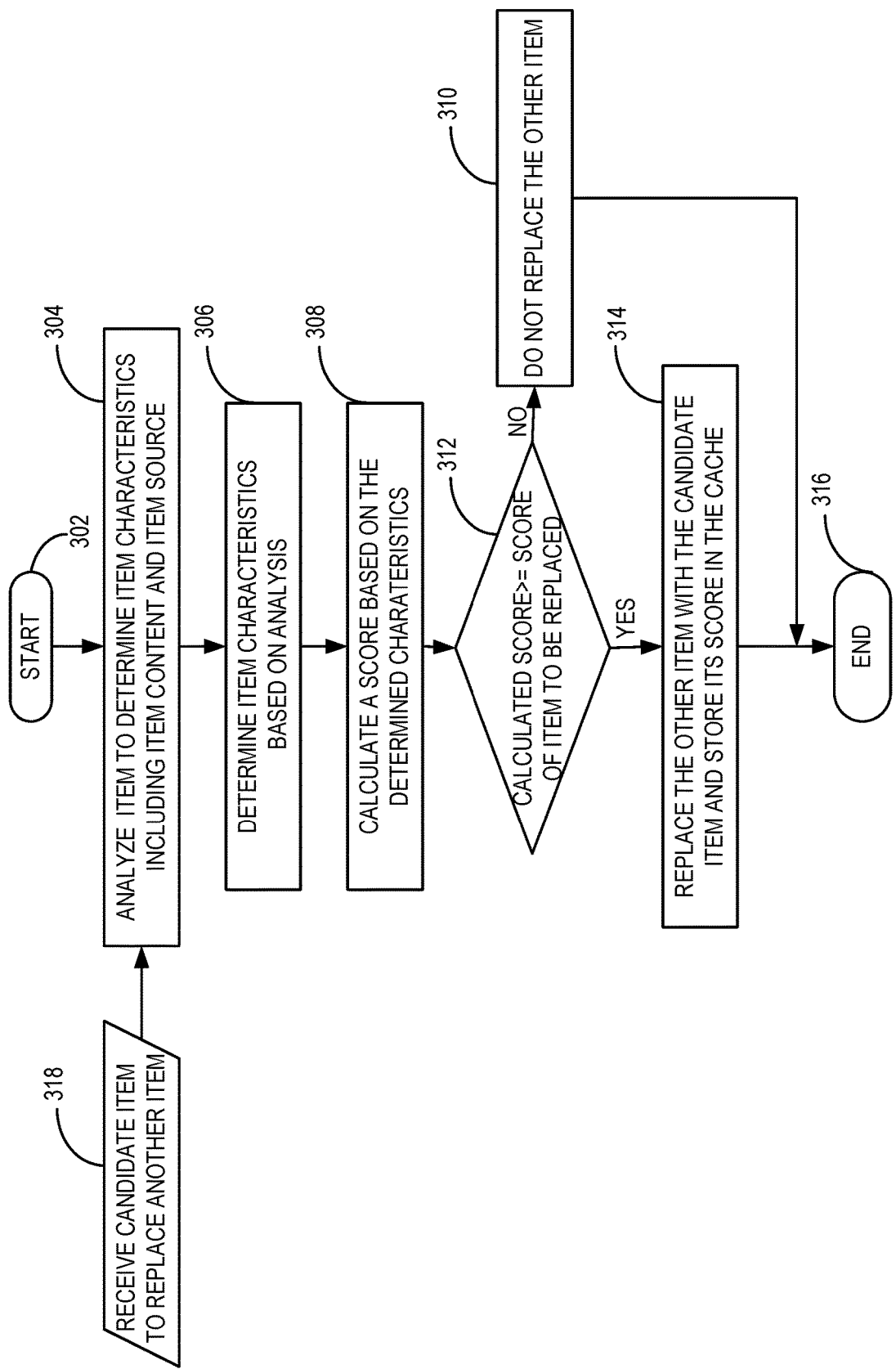
FIG. 3 illustrates a flowchart showing a method for replacing an item in a cache by another item, according to an example embodiment.

Referring next to FIG. 3, a flowchart illustrates a process for selecting an item to replace an existing item in the cache. The process begins at 302. At 318, an item is received to replace an existing item in the cache. The item is analyzed at 304 to determine the item characteristics. The characteristics include the source of the item and the content of the item. For instance, the source of the item may indicate how often the item is likely to be accessed and the analysis would indicate a probability of subsequent access. For example, an item from a LOG file is likely to be accessed more often than an item from an MP3 file. As another example, an item of a file accessed over a network may be a better candidate for caching and may be retained for a longer period of time in the cache because accessing over the network is more time consuming than accessing from a local file system. As regards content of the item, the content indicates, among other things, the criticality and the importance of the content.

At 306, the characteristics of the item are determined based on the analysis. At 308, a score associated with the item is calculated based on the determined characteristics. As discussed above, the characteristics include the item source and the item content. Hence, in one example, the calculated score is a function of at least the item source and the item content. In another example, other characteristics such as size is also taken into consideration, in addition to the item source and the item content, for calculating the score of the item. At 312, the calculated score is compared with the score of the item in the cache that is to be replaced by the received item. If the calculated score of the received item is greater than or equal to the score of the item to be replaced, the item in the cache is replaced by the received item at 314 and the score of the received item is stored with the received item in some example. In some other examples, the score of the received item is not stored. If the score of the item to be replaced is more than the calculated score of the received item, the existing item is maintained in the cache and the received item is not admitted into the cache at 310. The process ends at 316.

Figure 4:
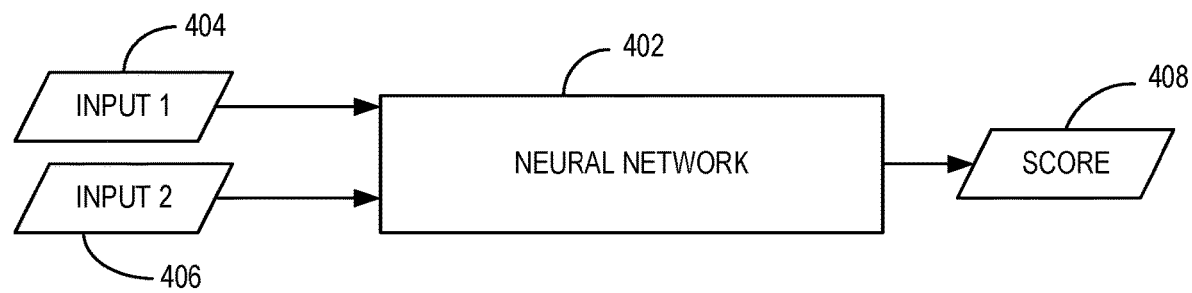
FIG. 4 is a block diagram illustrating a neural network used for calculating an item score, according to an example embodiment.

FIG. 4 illustrates a neural network 402 that may be used to calculate a score of an item received for caching. Input 1 is inputted to the neural network at 404. Input 2 is inputted to the neural network at 406. One of the determined characteristics is inputted as Input 1 and another determined characteristic is inputted as Input 2. In one example, a current block of a file is inputted as Input 1 and a preceding block of file is inputted as input 2. The neural network 402 produces a score associated with the item as output at 408 based on the received inputs. While FIG. 4 shows two inputs, less than two inputs and more than two inputs may be used in some examples. Inputs other than the current block and the preceding block are also contemplated. In one example, the neural network is a recurrent neural network.

The score outputted at 408 may be a floating point real number between 0 and 1. The score may be subdivided into various non-inclusive ranges (e.g. >0.1, 0.1-0.5, <0.5-0.7, <0.7, etc.) and different items falling within different ranges may be suitably stored in subcaches 1201-120N with their scores.

The neural network 402 may be trained using a plurality of training sets. For example, the user may provide a plurality of training sets each comprising one or more inputs with a corresponding output. Inputs from each training set are inputted to the neural network 402 and the parameters of the neural network 402 are adjusted so as to produce outputs that closely match the given output for each set. In an example, during the training phase, the values of weights and/or biases of the neural network are adjusted to produce closely matching outputs. In one example information about the weight adjustment is fed back to various layers from the output layer to reduce the overall output error. When the training phase ends, the feedback interaction within the network no longer remains.

Figure 5:
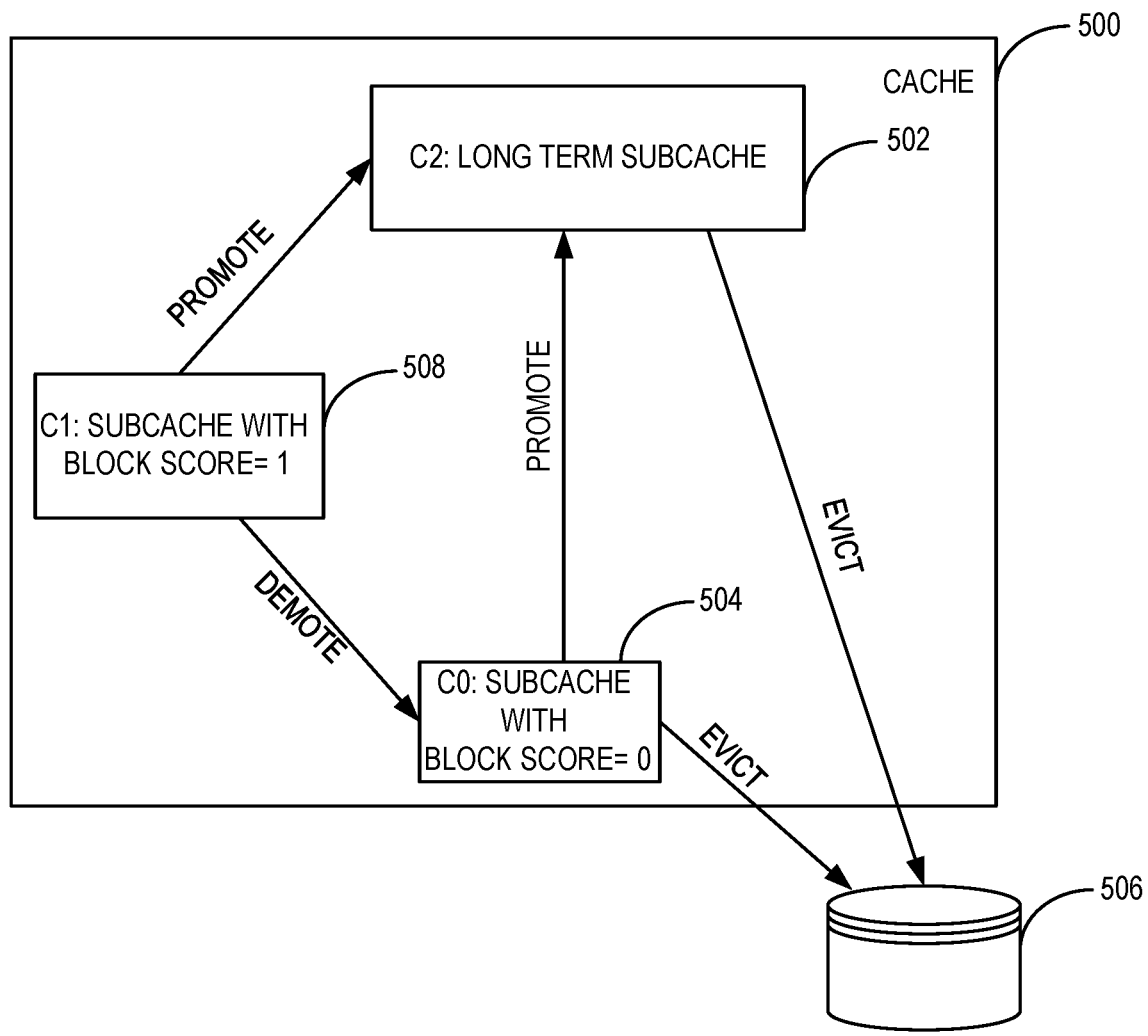
FIG. 5 is a block diagram illustrating a hierarchy of subcaches used for storing items, according to an example embodiment

FIG. 5 depicts a cache 500 comprising a hierarchy of three subcaches. At 502, a long term subcache C2 is shown. C2 is a high level subcache in the hierarchy. A middle level subcache C1 is shown at 508. A low level subcache C0 is shown at 504. At 506 a storage device is shown, that receives items evicted from C2 or C0 in some examples. In other examples the evicted items are discarded. An application trying to access an item in a cache is exposed to the cache 500. In one example, internally, upon a cache hit in either subcache C1 or subcache C0, the item is promoted to C2. Further, if an item is to be evicted from C1, it is not immediately trashed or transferred to storage 506. Rather the item is demoted (e.g., shifted) to C0. Further, when need arises, an item can be evicted from C2 and C0 and either trashed or stored in the storage 506.

In another example embodiment, the order of hierarchy is maintained in the block diagram shown in FIG. 5. In this example, when a cache hit occurs in C0, the item is first promoted to C1. Further, when a cache hit occurs in C1, the item is promoted to C2. Conversely, when an item is to be evicted from C2, it is demoted to C1. When an item is to be evicted from C1, it is demoted to C0. Only when an item is to be evicted from C0, it is flushed to the memory or trashed.

A process of filling a middle level subcache and a low level subcache in a subcaches hierarchy is next discussed with reference to FIG. 6. A process of searching an item in the hierarchy of three subcaches shown in FIG. 5, and promoting an item from one subcache level to another is discussed with reference to FIG. 7.

Figure 6:
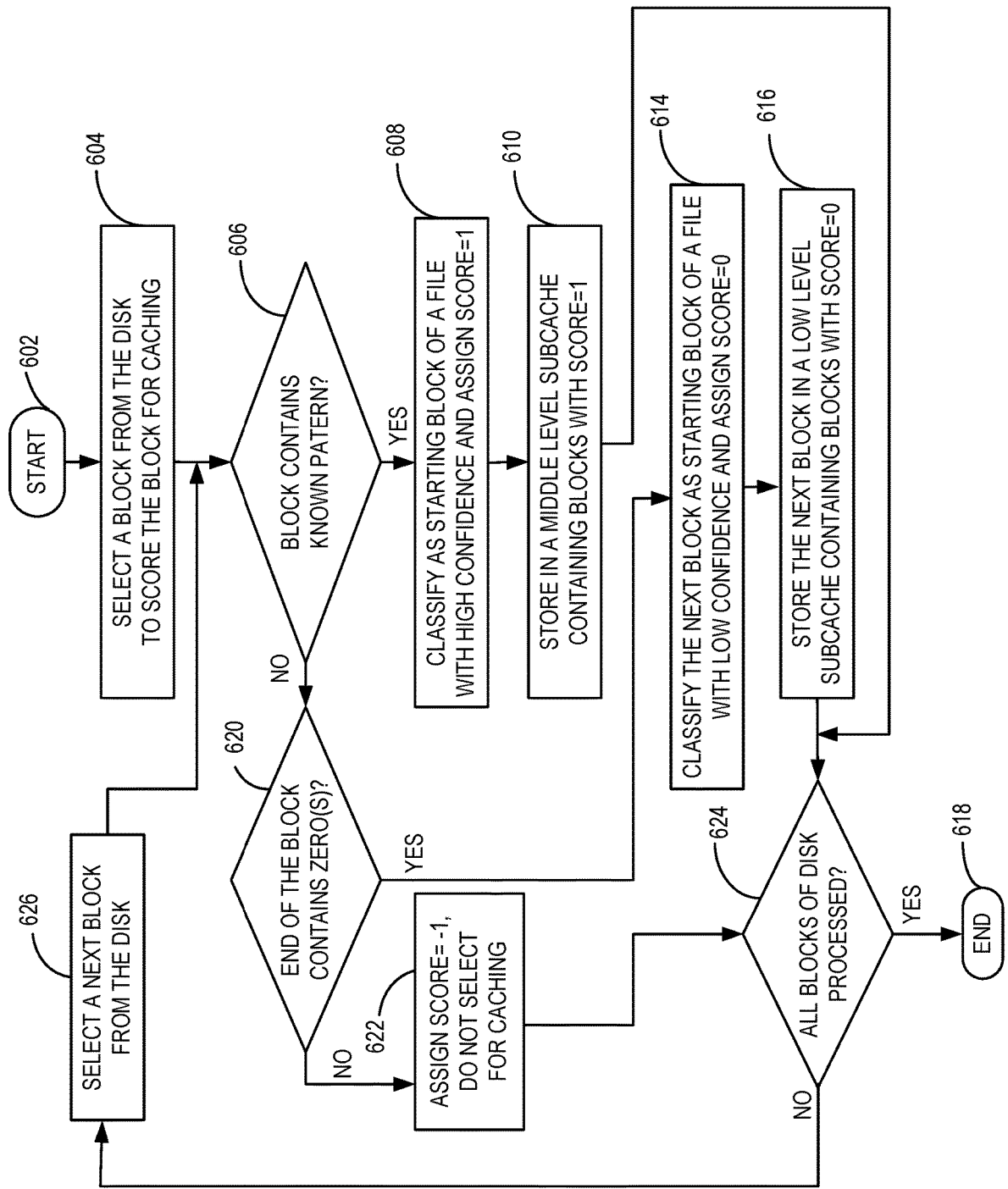
FIG. 6 illustrates a flowchart showing a method for placing an item in a subcache, according to an example embodiment

The flowchart shown in FIG. 6 illustrates one process of filling subcaches in a hierarchy of subcaches. The process begins at 602. At 604, a block of interest from the disk is selected to determine a score associated with the block and to identify a suitable subcache for the block. It is known that if the first block of a file can be identified then the whole file can be retrieved. Because a cache has limited space, only the first block of a file is cached (e.g., a hash of the first block is cached). There are at least two methods to determine with a certain probability if a block is the starting block of a file. It is known that a starting block contains a known pattern. Determination of the starting block via a known pattern is head recognition. The other method is to try to determine the last block of a file. It is known that the last block of a file may end in one or more zeros. If the last block of a file can be determined, then the next block would be the first block of the next file. Determination of a starting block via the last block is tail recognition.

Using head recognition to determine the starting block of a file is often more accurate than the using tail recognition. For example, the head recognition method is about ten times as accurate as the tail recognition method. Hence, a block identified as the first block using the head recognition method is placed in a higher subcache than a block identified as a first block using the tail recognition method.

At 606, it is checked if the block contains a known pattern. If the block contains a known pattern, the block is classified as the starting block of a file with a high degree of confidence and assigned a score of 1 at 608. At 610, the block is stored in a middle level subcache (e.g., C1). All blocks having a score of 1 are stored in the middle level subcache (e.g., C1).

On the other hand, if the block does not contain a known pattern, the tail recognition method is used. At 620, it is checked if the end of the block contains one or more zeros. If the end of the block contains one or more zeros, the next block is classified as the starting block of a file with a relatively low degree of confidence at 614 and the block is assigned a score of 0. At 616, the block is stored in the lower level subcache (e.g., C0).

However, if at 620 it is found that the block does not contain at least one zero in the end, then the block is given a score of 31 1 at 622 and the block is not stored in a subcache. Further, at 624 it is checked if all the blocks of the disk that were earmarked for caching have been processed. If all the blocks of interest on the disk have been processed, then the process ends at 618. If, however, all the blocks of interest on the disk have not been processed, then at 626 a next block of interest is selected from the cache and process continues until all the blocks of interest have been processed. The process ends at 618.

The process described with reference to FIG. 6 enables deduplication. As discussed herein, the process of recognizing a first block via head recognition has a high probability of correctness. Further, once the first block of a file is known, the file can be easily retrieved. When images of a disk are required to be transmitted over a network (e.g., in case of live migration of a virtual machine) only the first block of each file, recognized using head recognition, is sent over the network. Sending only specific blocks of file images uses much less bandwidth and can be achieved much faster than sending each block of a file image. Hence, during a live migration of a virtual machine, for example from one host to another, there will be no perceptible delay, as perceived by a user.

Figure 7:
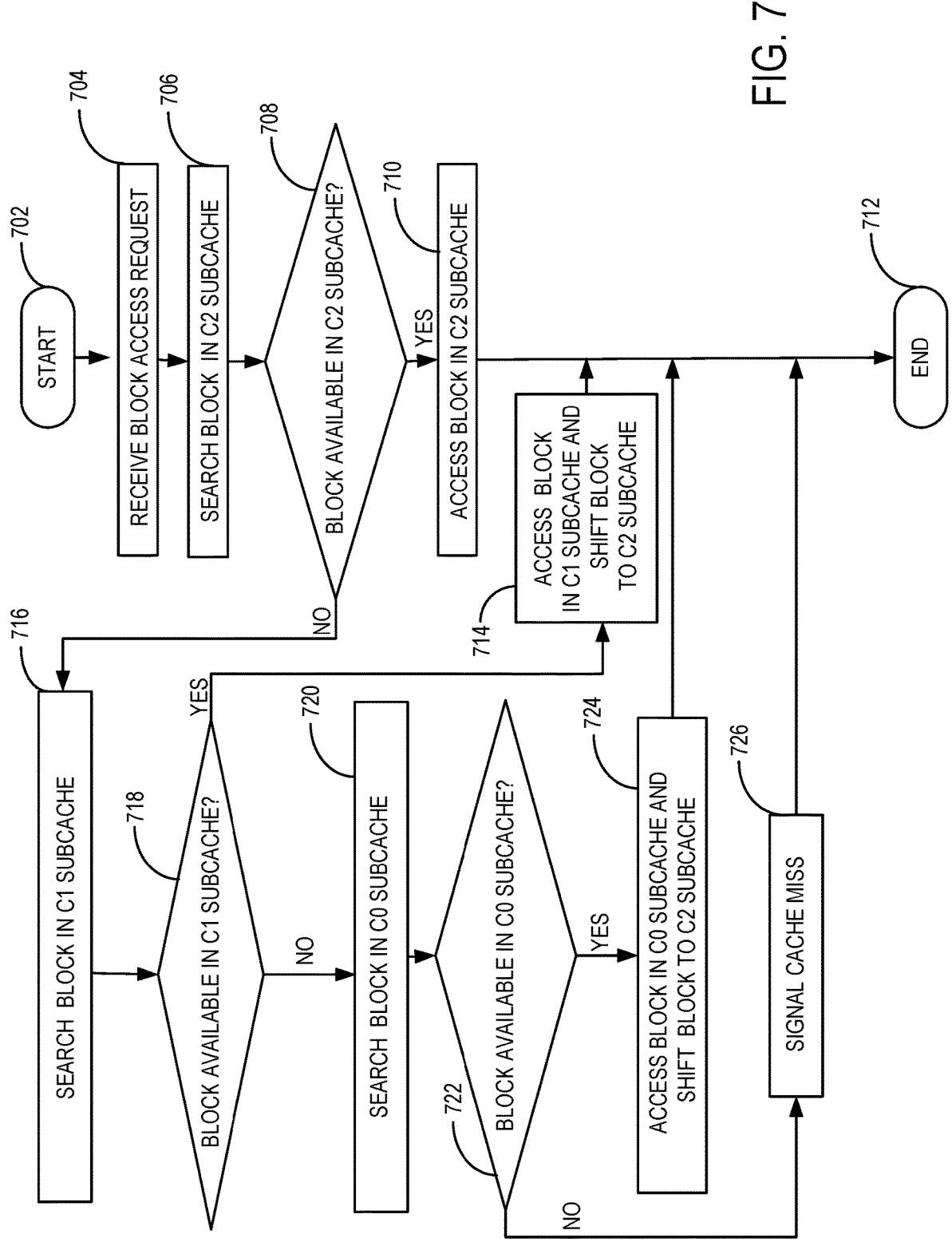
FIG. 7 is a flowchart illustrating a method for accessing an item from a subcache of the hierarchy of subcaches.

Referring next to FIG. 7, a flowchart illustrates a process of servicing data requests using a three level hierarchy of subcaches. The process begins at 702. At 704, a request to access a block is received. As discussed with reference to FIG. 5, the request is directed to the cache 500. However, internally the block is first searched in a high level subcache (e.g., C2) because items promoted from middle level subcache and low level subcache are stored in the high level subcache. If the block is found in the high level subcache, at 708, the block is accessed in the high level subcache at 710. If the block is not available in the high level subcache, the block is searched in the middle level subcache (e.g., C1) at 716. If the block is available in the middle level subcache at 718, the block is accessed in the middle level subcache at 714 and the block is shifted to the high level subcache. The process of shifting data from a middle level subcache to a high level subcache is shown as promotion in FIG. 5.

If the block is not available in the middle level subcache at 718, the block is searched in the low level subcache (e.g., C0) at 720. If the block is available in the low level cache at 722, then the block is accessed in the low level subcache and the block is shifted to the high level subcache at 724. The process of shifting data from a low level subcache to a high level subcache is shown as promotion in FIG. 5. If the block is not available even in low level cache, a cache miss is signaled at 726. The process ends at 712.

As can be seen in the example, in a three level subcache implementation, the middle level subcache stores items with a score of 1. The low level subcache stores items with a score of 0. The high level subcache stores items promoted from the middle level subcache or the low level subcache upon a cache hit (see FIG. 5). In one example, the high level subcache is considered to be storing items with a score of 2. Each subcache stores items with a given score. Therefore, an advantage of the described three level cache is that score need not be stored with the item, because depending upon where an item is stored, its score is known. This example implementation therefore saves additional cache space that can used to store more items than an implementation which employs storage of the score together with the item.

In another example of a three level subcache, depending upon the score of an item that is an admission candidate, the item is stored in C2, C1, and C0. Further, during a subcache access, if a cache hit occurs in C0, the item is promoted to C1, and if a cache hit occurs in C1, the item is promoted to C2 (not shown). Similarly, an eviction candidate in C2 is demoted to C1 and an eviction candidate in C1 is demoted to C0. In this example, items are evicted only from C0. In this case and other cases, where a particular subcache stores items with the same score (e.g., C1 storing items with score of 1 only), an eviction candidate can be decided using LRU, FRU, TLRU, PLRU, FIFO, random, or any other suitable method.

Figure 8:
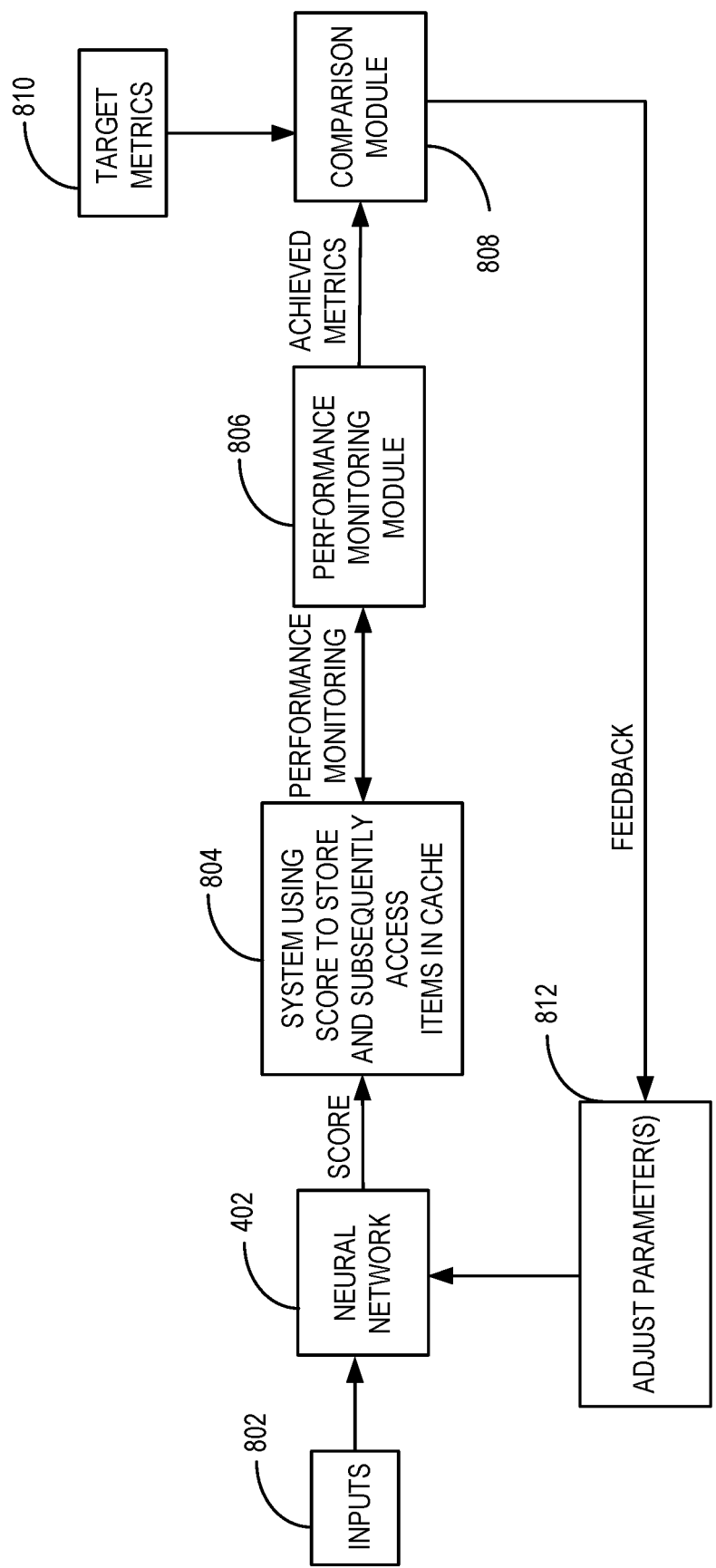
FIG. 8 is a block diagram illustrating a neural network with feedback facilitating adjustment of neural network parameters, according to an example embodiment.

Referring next to FIG. 8, a block diagram shows a system of providing feedback to the neural network 402 for optimizing the performance of the neural network 402. At 802, inputs representing the characteristics of the item to be cached are inputted to the neural network 402. The output of the neural network 402 is a score that is used to make a decision as to whether the item should be admitted to the cache 120. At 804, a system stores the item in the cache 120 and uses the cache when an application requests access to an item. Performance of the system is monitored by a performance monitoring module at 806 and metrics as achieved by the system are calculated. In one example, the achieved metrics are measured in terms of cache hit ratio, however other performance metrics are also contemplated. At 808, the achieved metrics are compared with target metrics 810. A feedback generated by the comparison module 808 is fed back at 812 to adjust parameters of the neural network to optimize its performance. In one example, the performance is optimized at predetermined intervals.

Exemplary Scenarios

In an exemplary scenario, in which a cache 500 with three level of subcaches as shown in FIG. 5 is used, an MP3 application requests access to an item. The request is directed to cache 500. The item is not found in any of the subcaches of the cache 500, and is consequently retrieved from the main memory. The item is now a candidate for caching. A score associated with item is calculated using the neural network shown in FIG. 4. In this example, the output of the neural network is not an integral value, but rather the output is a floating point real number between 0 and 1. To make a decision as to where the item should be stored within the cache 500 or not stored, the score should have a value of −1, 0 or 1. To convert a floating point number between 0 and 1 to an integral value between −1, 0 and 1, a conversion module with the following exemplary function is used.

{if score<0.1|output=−1}

{if score=0.1-0.5|output=0}

{if score>0.5|output=1}

Using the above conversion function for a three level subcache implementation, an item is stored in an appropriate subcache or not stored based on the output of the function as shown above, when the initial calculated score is a floating point number between 0 and 1. The ranges of floating point numbers, as shown above, are for illustration purpose only, and other suitable ranges may be used in other examples.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The examples illustrated and described herein as well as examples not specifically described herein but within the scope of aspects of the invention constitute exemplary means for implementing optimization of usage of one or more caches by using a score-based on the characteristics of an item which is a candidate for cache admission or eviction. For example, the elements illustrated in the figures, such as when encoded to perform the operations illustrated in the figures, constitute exemplary means for analyzing an item to determine characteristics of the item, the characteristics comprising item content, or item source or both, exemplary means for calculating a score associated with the item based on the determined characteristics, and exemplary means for admitting the item into the cache based on the calculated score.

Alternatively, or in addition to the other examples described herein, examples include any combination of the following:
  at least one memory comprising computer program code, the at least one memory and the computer program code configured to, with the at least one physical processor, cause the processor to at least:
  analyze the item to determine characteristics of the item, the characteristics comprising item content, or item source or both,
  based on the determined characteristics, calculate a score associated with the item,
  admit the item into a cache based on the calculated score.
  provide a cache that comprises a plurality of subcaches arranged in a hierarchy with a higher level subcache storing items of a plurality items having higher calculated scores and a lower level subcache storing items of the plurality items having lower calculated scores than the higher calculated scores.
  provide a cache that stores a score associated with the item with the item.
  identify a source that comprises a type of the file and content that comprises a criticality or an importance or both the criticality and importance.
  upon an item becoming a candidate for eviction from a higher level subcache, shifting the candidate item to a lower level subcache.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term 'computing device' and the like are used herein to refer to any device with processing capability such that it can execute instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for admitting an item of a plurality of items into a cache, the system comprising:
   at least one physical processor; and
   at least one memory comprising computer program code, the at least one memory and the computer program code configured to, with the at least one physical processor, cause the processor to at least:
      analyze the item to determine characteristics of the item, the characteristics comprising item content and item source;
      based on the determined characteristics, calculate a score associated with the item at least by:
         setting a value of the calculated score high upon determining that the item contains a known pattern, and
         setting the value of the calculated score low upon determining that the item does not contain the known pattern, the low value being less than the high value; and
      admit the item into the cache based on the value of the calculated score.

2. The system of claim 1, wherein the score is stored with the item in the cache.

3. The system of claim 1, wherein the cache comprises a plurality of subcaches arranged in a hierarchy with a higher level subcache storing items of the plurality of items having the high value of the calculated score and a lower level subcache storing items of the plurality items having the low value of the calculated score.

4. The system of claim 1, wherein upon determining that the item does not contain the known pattern, the computer program code is further configured to determine whether the item contains at least one zero and upon determining that the item contains the at least one zero the item is admitted to a lower level subcache.

5. The system of claim 3, wherein upon an item becoming a candidate for eviction from a higher level subcache, the candidate item is shifted to a lower level subcache.

6. The system of claim 1, wherein the computer program code is further configured to subsequently evict the admitted item from the cache based on the calculated score.

7. A method for admitting an item of a plurality of items into a cache, the method comprising:
   analyzing the item to determine characteristics of the item, the characteristics comprising item source;
   based on the determined characteristics, calculating a score associated with the item at least by:
      setting a value of the calculated score high upon determining that the item contains a known pattern, and
      setting the value of the calculated score low upon determining that the item does not contain the known pattern, the low value being less than the high value; and
   admitting the item into the cache based on the value of the calculated score.

8. The method of claim 7, wherein the score is stored with the item in the cache.

9. The method of claim 7, wherein the cache comprises a plurality of subcaches arranged in a hierarchy with a higher level subcache storing items of the plurality items having the high value of the calculated score and a lower level subcache storing items of the plurality items having the low value of the calculated score.

10. The method of claim 7, wherein upon determining that the item does not contain the known pattern, determining whether the item contains at least one zero and upon determining that the item contains the at least one zero, the item is admitted to a lower level subcache.

11. The method of claim 9, wherein upon an item becoming a candidate for eviction from a higher level subcache, the candidate item is shifted to a lower level subcache.

12. The method of claim 7, further comprising subsequently evicting the admitted item from the cache based on the calculated score.

13. One or more non-transitory computer storage media having computer-executable instructions that, upon execution by a processor, cause the processor to at least perform operations comprising:
   analyzing an item to determine characteristics of the item, the characteristics comprising item source;
   based on the determined characteristics, calculating a score associated with the item at least by:
      setting a value of the calculated score high upon determining that the item contains a known pattern, and
      setting the value of the calculated score low upon determining that the item does not contain the known pattern, the low value being less than the high value; and
   admitting the item into a cache based on the value of the calculated score.

14. The one or more non-transitory computer storage media of claim 13, wherein the score is stored with the item in the cache.

15. The one or more non-transitory computer storage media of claim 13, wherein the cache comprises a plurality of subcaches arranged in a hierarchy with a higher level subcache storing items having the high value of the calculated score and a lower level subcache storing items having the low value of the calculated score.

16. The one or more non-transitory computer storage media of claim 15, wherein upon an item becoming a candidate for eviction from a higher level subcache, the candidate item is shifted to a lower level subcache.

17. The one or more non-transitory computer storage media of claim 13, wherein upon determining that the item does not contain the known pattern, the instructions further cause the processor to determine whether the item contains at least one zero and upon determining that the item contains the at least one zero, the item is admitted to a lower level subcache.

18. The one or more non-transitory computer storage media of claim 13, wherein the computer-executable instructions, upon execution by the processor, further cause the processor to perform operations comprising subsequently evicting the admitted item from the cache based on the calculated score.

19. The system of claim 3, wherein upon finding an item in the lower level subcache during an application accessing the cache for an item, the item is promoted to the higher level subcache.

20. The method of claim 9, wherein upon finding an item in the lower level subcache during an application accessing the cache for an item, the item is promoted to the higher subcache.

* * * * *